(12) United States Patent
Cotton

(10) Patent No.: US 7,395,690 B2
(45) Date of Patent: Jul. 8, 2008

(54) FLOWMETER/PROVER SYSTEM AND METHOD

(76) Inventor: Galen Cotton, 2226 Bauer Dr., Houston, TX (US) 77080

( * ) Notice: Subject to any disclaimer, the term of this patent is extended or adjusted under 35 U.S.C. 154(b) by 70 days.

(21) Appl. No.: 11/533,012

(22) Filed: Sep. 19, 2006

(65) Prior Publication Data

US 2007/0169537 A1    Jul. 26, 2007

Related U.S. Application Data

(63) Continuation-in-part of application No. 11/340,374, filed on Jan. 26, 2006.

(51) Int. Cl.
*G01P 21/00* (2006.01)
(52) U.S. Cl. ........................................ 73/1.19
(58) Field of Classification Search ................... 73/1.19
See application file for complete search history.

(56) References Cited

U.S. PATENT DOCUMENTS

| | | | |
|---|---|---|---|
| 3,273,375 A | 9/1966 | Howe | |
| 3,492,856 A * | 2/1970 | Francisco, Jr. | ............... 73/1.19 |
| 3,580,045 A | 5/1971 | Pfrehm | |
| 4,372,147 A | 2/1983 | Waugh et al. | |
| 4,475,377 A | 10/1984 | Halpine | |
| 4,606,218 A | 8/1986 | Chisman, III | |
| 4,619,134 A | 10/1986 | Bohm et al. | |
| 4,631,951 A * | 12/1986 | Bohm | ........................ 73/1.22 |
| 5,392,632 A | 2/1995 | Umeda et al. | |

OTHER PUBLICATIONS

Elliott, Kenneth D., "API's Microprocessor Based Flowmeter Testing Programme", Omni Flow Computers Inc., International School of Hydrocarbon Measurement (ISHM), University of Oklahoma, 2005, pp. 1-14.

Slide Presentation developed by Cotton Products, LLC, entitled "Temporal Correction of Flowmeter Output with Liquid Flowmeter Provers and the Impact of Computationally Derived Flow Integration on Reproducibility of the Meter Factor", Dec. 2005.

* cited by examiner

*Primary Examiner*—Robert R Raevis
(74) *Attorney, Agent, or Firm*—Kenneth L. Nash

(57) ABSTRACT

A pulse production interval measurement module (or temporal reconciliation module) for preferred use with a computational flowmeter and/or non-computational flowmeters to thereby temporally reconcile or time shift flowmeter output produced by a volume of fluid flow through the computational flowmeter with the start and stop times of the flow of a calibrated fluid volume through a prover. The pulse production interval measurement module may be implemented with software and/or hardware and operate on stored data or real time or near real time measurements.

20 Claims, 6 Drawing Sheets

FLOWMETER/PROVER SYSTEM AND METHOD

This application is a continuation-in-part and claims priority to U.S. application Ser. No. 11/340,374, filed Jan. 26, 2006.

BACKGROUND OF THE INVENTION

1. Field of the Invention

The present invention relates generally to flowmeters and provers and, more particularly, to a system and methods for proving flowmeters which provide computationally derived readings of fluid flow, such as ultrasonic flowmeters and Coriolis mass flowmeters.

2. Description of the Background

As referred to herein, flowmeters that mechanically integrate the flow profile and produce representative output pulses are referred to as mechanical or non-computational flowmeters, because they contain components that move in response to fluid flow such as turbines, vanes, paddles, or the like, that are mechanically related to the flow. In these meters, a number of turns of a turbine, for instance, may be utilized to determine the flow with minimal or no computations required. Computational flowmeters, as used herein, refers to flowmeters to measure fluid flow without use of mechanically moving elements within the fluid flow path. Examples of computational flowmeters include ultrasonic flowmeters and Coriolis mass flow meters. Meters of this type integrate the flow field through data assimilation and calculation. Both computational and non-computational flowmeters may produce pulses wherein the number of pulses is related to measurement of fluid flow.

Meter provers use a calibrated section of pipe with appropriate starting and ending sensors. A flag or displacer moves between the starting and ending sensors along with a calibrated fluid column. The meter prover provides a means of comparing a known volume (the volume between the detectors) with the reported throughput of the meter.

In many cases, valuable fluid flows through pipelines. In such cases, it is absolutely necessary to verify meter operation at regular intervals so that proper accounting may be made for the volume of fluid that flows through the pipeline. By proving the meters on a regular basis, e.g., monthly, the flowmeter accuracy can be verified so that accounting requirements are satisfied. Flowmeter inaccuracies may be caused by temporary problems due to the passage of contaminants through the line. Flowmeter inaccuracies may also be more of a permanent nature due to flowmeter wear, obstruction, and the like. Wear is especially prominent on the non-computational or mechanical flowmeters. On the other hand, the computational flowmeters have little wear due to the absence of moving mechanical components within the flow stream.

Meter provers are of several types. Large volume meter provers utilize a large calibrated volume and are heavy and bulky. Small volume meter provers utilize a small calibrated volume of fluid. The small volume meter provers are compact and portable and may be readily used in the field to test the flowmeters. Small volume meter provers may often be called dual chronometry provers because these provers utilize two highly accurate clocks to control and process the collection of meter pulses. A representative dual chronometer meter prover 10 is shown in FIG. 1. In this example, region 12 in flow tube 14 between first detector 16 and second detector 18 is the calibrated volume. The process collects only whole pulses produced by the flowmeter and thereby avoids the difficulty of reconciling partial pulses against the prover's collected volume. This is accomplished by starting the pulse collection with the first whole pulse as indicated at 20 after first detector 16 in the prover 10 is tripped by flag or displacer 24. The pulse may be started at the zero crossing, rising, falling edges, selected trigger levels, or the like as desired. Simultaneously, a high speed clock begins timing the duration of the pulse collection as discussed below. This process ends when the leading edge, or other selected portion of the first pulse is encountered as indicated at 22 after the second prover detector 18 is tripped. The meter prover computations result in producing a meter factor K which provides the number of pulses from the flowmeter per unit of volume through the pipeline.

As a practical matter, the small volume meter provers with dual chronometers are often the only economical means for proving flowmeters for pipelines in the field. However, it has been found that the computational flowmeters produce unacceptable variations when tested at different times by dual chronometry small volume provers. The computational flowmeter variations may be decreased to an acceptable level when tested using large volume meter provers. However, the large volume meter provers are not practical for field use where the flowmeters are tested. Due to these problems, computational flowmeters are not always acceptable for use in pipelines for accounting purposes where it is required that the flowmeters be successfully proved.

However, it would be highly desirable and economical to be able to utilize the computational flowmeters in such pipelines due to the fact that computational flowmeters have less wear than the non-computational flowmeters with moving parts. Use of computational flowmeters could provide more reliable measurements without the need to change out flowmeters so frequently. Efforts have been made in the past by those of skill in the art to correct these problems, but solutions have not been found that are acceptable by the pipeline industry.

In more detail, dual chronometry provers utilize two clocks to control the collection of meter pulses so as to collect only whole pulses and avoid the difficulty of reconciling partial pulses against the prover's collected volume. As noted above, meter prover 10 has two spaced apart detectors between which is an exactly calibrated volume 12. Flag or displacer 24 is released for proving and flows with the fluid in flow tube 14. Pulse collection of pulses 26 produced by the flowmeter to be tested is started with the first whole pulse as indicated at 20 produced after first detector 16 in prover 10 is tripped by displacer 24. Simultaneously, a high speed clock begins timing the duration of the pulse collection, i.e.; the time between the points indicated at 20 and 22.

Double chronometry pulse interpolation uses a high frequency master oscillator which increments time very precisely (e.g., 0.000001 parts of a second). This master oscillator operates two counters which may be referred to herein as time counter "A" and time counter "B." Time counter "A" is started when displacer or flag 24 trips first detector switch 16. Time counter "B" is started with the leading edge of the first flowmeter pulse as indicated at 20 after counter "A" has started. Counter "A" is stopped when displacer or flag 24 trips final detector switch 18. Time counter "B" is stopped with the leading edge of the first flowmeter pulse after counter "A" has stopped as indicated at 22. Using the ratio of the counter time "A" and counter time "B" will allow for accurately counting a fraction of a flowmeter pulse as shown below:

$$K \text{ in pulses/unit volume} = (\text{Time } A \text{ in seconds}/D \text{ in unit volume}) \times (C \text{ pulses/Time } B \text{ in seconds})$$

where:
- K=K-Factor or pulses per unit volume from the flowmeter
- A=Time for displacing calibrated volume measured by first time counter
- B=Time for whole flowmeter pulses measured by second time counter
- C=Total number of whole flowmeter pulses
- D=Calibrated volume Typical Example for 12" Small Volume Prover:

A=000.58377 seconds as determined from time counter "A"

B=000.58329 seconds as determined from time counter "B"

C=Accumulated whole pulses produced by the tested flowmeter as determined by a pulse counter (the pulse counter may or may not be part of the flowmeter)

D=Known displaced volume between the first time counter and the second time counter (e.g., as determined by water draw certification)

In this example K=0.58377 seconds/0.35714bbl×364 pulses/0.58329 seconds.

Accordingly K=1020.0468 pulses per bbl (or other unit of volume)

The following patents disclose various types of provers.

U.S. Pat. No. 3,273,375, issued Sep. 20, 1966, to Howe, discloses a calibrating barrel. More particularly, the invention relates to an apparatus for calibrating a flow meter. Still more particularly, the invention relates to an improved calibrating barrel for use in an apparatus to calibrate flow meters, the invention being characterized by increased accuracy, economy of construction and dependability.

U.S. Pat. No. 3,580,045, issued May 25, 1971, to Pfrehm, discloses a bidirectional meter prover adapted to be connected to a conduit having a meter arranged therein with a valve means connected to the calibration barrel of the meter prover and to the meter such that the valve means is rapidly shifted for movement of the piston in the meter prover in either direction in the calibration barrel for proving the meter. The meter prover is adapted for proving meters used for metering cryogenic liquids with the cryogenic liquid being introduced into the meter proving system and with the cryogenic liquid being vented as the system is cooled to equilibrium temperature; venting is stopped while introduction of cryogenic liquid is continued until thermal equilibrium is reached. Thereafter, the system is operated to prove the meter at equilibrium temperature.

U.S. Pat. No. 4,372,147, issued Feb. 8, 1983, to Waugh et al, discloses a flow meter prover which includes an outer fluid housing having an inlet and an outlet, a measuring conduit coaxially mounted within the outer housing and having first and second sets of fluid apertures adjacent, respectively, the upstream and downstream ends thereof, a fluid barrier mounted within the annular cavity between the outer housing and the conduit, a controllable piston mounted within the conduit, an actuating rod axially projecting from the downstream side of the piston where the free end of the rod extends through the downstream end of the outer housing, a bypass valve connected between the inlet and outlet of the outer housing, and first and second piston detection switches spaced apart along the length of the measuring conduit. There are provisions for automatically correcting for variations in the dimensions of the measuring conduit due to variations in fluid temperature. The prover also includes apparatus for continuously monitoring the integrity of the piston seals, and may be operated with equal fluid pressure on both sides of the piston.

U.S. Pat. No. 4,475,377, issued Oct. 9, 1984, to Halpine, discloses an apparatus for use in calibrating a meter having an outer tubular housing closed at each end, a reduced diameter and reduced length inner tubular barrel supported within the outer house providing an annular space between the exterior of the barrel and the interior of the housings, two spaced apart ports in the housing communicating with the annular area, an annular flange secured to the interior wall of the housing having an opening therein receiving the barrel and an annular flange between the exterior of the barrel and the interior of the housing—dividing the annular space into two portions, the annular flange being arranged so that the barrel may be easily and expeditiously removed while ensuring that no leakage occurs past the flange, a free piston in the barrel and piston detection switches spaced apart on the barrel providing means of indicating passage of precise amount of gas or liquid through the barrel.

U.S. Pat. No. 4,606,218, issued Aug. 19, 1986, to Chisman, III, discloses a compact bidirectional meter prover mechanism that incorporates a straight calibration barrel having spaced detectors sensing passage of a fluid induced displacer piston. A four-way control valve is connected by flow conduits to the conduit containing the flow meter and is connected by a conduit system to respective extremities of the calibration barrel. Launch valves are interposed between the control valve and the calibration barrel and are selectively positioned to permit metering flow through the calibration barrel only after the control valve has been positioned for directional flow of fluid through the conduit system and the calibration barrel. Thus, the necessity for piston prerun is eliminated and minimum cycle time is permitted. The length of the calibration barrel is also minimized by elimination of piston prerun.

U.S. Pat. No. 4,619,134, issued Oct. 28, 1986, to Bohm et al, discloses a testing device for at least one flow meter installed in a pipeline. The device includes a calibration container connected to the pipeline across a switch-over valve. A measuring piston is guided for reciprocating movement in the container between a starting and a terminal position. The measuring piston supports two signal releasing rings which are spaced apart from the other about a distance which when multiplied by the inner clearance of the calibration container determines a calibration volume of the measuring path of the piston. At least one signal generator is installed in the wall of the calibration container and cooperates in a contactless manner with the first and second signal releasing rings so as to produce start and stop pulses for one measuring cycle. The flow meter is connected to a pulse generator responsive to the flow rate and connected to an evaluation circuit which after completion of a measuring cycle compares the counted pulses with the calibration volume.

U.S. Pat. No. 5,392,632, issued Feb. 28, 1995, to Umeda et al, discloses a small volume prover which is compact and capable of obtaining highly reliable measurement, keeping a highly accurate base volume without being affected by temperature and pressure of fluid to be measured. The prover includes a cylindrical outer housing having a fluid inlet and a fluid outlet spaced apart from each other, a cylindrical measuring conduit having both open ends and first and second sets of fluid ports radially made in a wall thereof and coaxially mounted within the outer housing and an annular wall mounted between the outer housing and the measuring conduit at the position between the measuring conduit open end and the first set of ports thereof to form an upstream annular passage and a downstream annular passage. During proving preparation a piston is restrained by a piston actuator provided in the outlet-side end of the outer housing to permit the fluid to pass through the annular passage. At the time of measurement start, the piston is released to run and a valve actuator provided at the inlet side acts as a slide valve to close the first sets of fluid holes.

The above cited prior art does not provide a solution to the aforementioned problems. As noted above, it has been found that when utilizing the dual chronometer small volume prover, that K when determined at the measurement proving intervals, e.g., monthly or quarterly or the like, has varied out of range for the computational flowmeters or flowmeters with no required moving parts in the flow path. This problem is not observed in functioning non-computational flowmeters or flowmeters with moving parts where the measuring element movements are directly sensed within the flow path as with turbine meters. The condition may attain where devices are subject to delay created by gearing clearances or where ancillary devices such as pulse doublers and electronic linearization of the meter's output are utilized. Consequently, there remains a long felt need for improved methods for proving computational flowmeters utilizing dual chronometer small volume provers. Because those skilled in the art have recognized and attempted to solve these problems in the past, they will appreciate the present invention which addresses these and other problems.

SUMMARY OF THE INVENTION

It is an object of the present invention to provide an improved flowmeter/proving system and method.

It is another object of the present invention to detect the problems related to dual chronometer small volume proving errors in computational flowmeters.

It is yet another object of the present invention to provide an improved computational flowmeter or meter which requires no moving parts in the flow path.

It is yet another object of the present invention to provide a prover operable to detect errors in computational and non-computational prover/flowmeter systems.

It is yet another object of the present invention to provide an improved dual chronometer small volume prover (tester).

It is yet another object of the present invention to provide an improved proving method.

It is yet another object of the present invention to provide that computational flowmeters or flowmeters that do not need moving parts can be reliably proved and thereby utilized in pipelines for accurate measurement with reduced flowmeter wear problems.

It is yet another object of the present invention to provide a prover that can be utilized for proving existing computational flowmeters.

These and other objects, features, and advantages of the present invention will become apparent from the drawings, the descriptions given herein, and the appended claims. However, it will be understood that the above-listed objectives and/or advantages of the invention are intended only as an aid in quickly understanding aspects of the invention, are not intended to limit the invention in any way, and therefore do not form a comprehensive or restrictive list of objectives, and/or features, and/or advantages.

Accordingly, the present invention provides a method for proving a computational flowmeter in response to a fluid flow rate through a prover. The computational flowmeter produces a series of computational flowmeter output pulses wherein each computational flowmeter output pulse is representative of a volume of fluid flow through the computational flowmeter. In one embodiment, the method may comprise determining a time interval C of between at least one particular volume of the fluid flow past at least one measuring element of the computational flowmeter and a subsequent production of a computational flowmeter output pulse that represents the particular volume of fluid flow. In this example, the time interval C represents a delay time during which the volume of fluid flow is displaced from the measuring element by a physical distance of the time interval C multiplied by the fluid flow rate.

Other steps might comprise determining a time interval A for a calibrated volume of fluid to flow through a pipe and utilizing the time interval C for selecting a time interval B portion of the series of computational flowmeter output pulses for comparison, with the time interval A to prove the computational flowmeter.

The method might further comprise determining the time interval A for the calibrated volume of fluid through a pipe by starting a clock A and stopping the clock A as a displacer moves through a calibrated volume of pipe and selecting a beginning for the time interval B portion of the series of computational flowmeter output pulses for comparison with the time interval A to prove the computational flowmeter by selecting a whole computational flowmeter output pulse that occurs after starting clock A, and after the time interval C.

The method might further comprise selecting an ending for the time interval B portion of the series of computational flowmeter output pulses for comparison with the time interval A to prove the computational flowmeter by selecting a whole computational flowmeter output pulse that occurs after stopping clock A, and after the time interval C.

Other steps might implementing the method utilizing software or hardware or a combination of software and hardware and/or utilizing collected and stored data for the selecting of the time interval B portion of the series of computational flowmeter output pulses for comparison with the time interval A to prove the computational flowmeter.

In one possible embodiment, the determining of a time interval C might comprise electrically exciting at least one measuring element of the computational flowmeter and activating a timer in response to the excitation of the measuring element and stopping said timer when a resulting flowmeter output pulse is produced.

In another possible embodiment, the determining a time interval C might comprises detecting a change of the fluid flow rate through the prover.

In another possible embodiment, the determining a time interval C further comprises might comprise detecting switching the prover to a bypass mode of operation.

The invention may comprise a flowmeter/proving system with elements such as, for example only, a calibrated portion of pipe for measuring a calibrated volume of fluid with which to prove a flowmeter and a displacer moveable through the calibrated portion of pipe for displacing the calibrated volume of water for proving the flowmeter while the flowmeter/proving system is in a proving mode of operation.

Position detectors may be utilized for detecting a position of the displacer in the proving mode of operation. A bypass flowpath may be utilized for use during a bypass mode of operation that permits fluid flow through the flowmeter when the displacer is not being used for displacing the calibrated volume of fluid. An operation mode detector may be utilized for detecting a change of operation between the proving mode of operation and the bypass mode of operation. Other elements might comprise a fluid flow detector for determining a change in fluid flow through the flowmeter as a result of the change of operation between the proving mode of operation and the bypass mode of operation. A timer may be provided for measuring a time interval C which is the time between the change of operation and the change in fluid flow.

The position detectors may or may not comprise at least two detectors positioned at a beginning and an end of the calibrated portion of pipe and may further comprise an A timer for measuring a time interval A for the calibrated volume of fluid to flow through the calibrated portion of pipe.

The fluid flow detector may comprise a processor and/or software for analyzing an output of the flowmeter and selecting an interval B portion of the output for comparison with the time interval A in proving the flowmeter.

Accordingly, the present invention may comprise a flowmeter/proving system for proving a computational flowmeter. The computational flowmeter may produce a flowmeter output signal for measuring fluid flow through the computational flowmeter. The computational flowmeter may comprise one or more measurement elements. The prover may comprise a timer for measuring a time interval A during which a calibrated volume of fluid flows within a prover. In one possible non-limiting example, the system may comprise a temporal reconciliation assembly for correlating in time the flowmeter output signal with the measured time A to permit comparison between a volume of fluid flow through the computational flowmeter and the calibrated volume of fluid flow through the prover.

In one possible embodiment, the temporal reconciliation assembly may be operable for determining a delay or interval time C and/or produce signals related to interval time C or some part of interval time C. The interval time C may comprise a time measurement beginning with electrical, magnetic, vibrational or other type of excitation of one or more of the measurement elements in a computational flowmeter until the resulting production of an output signal.

The flowmeter output signal may or may not comprise a series of flowmeter pulses. In one embodiment where the flowmeter output signal is a series of flowmeter pulses, the interval time C might in one embodiment comprise measurement from electrical excitation of a measurement element until production of a flowmeter pulse.

The flowmeter/proving system may further comprise a timer B for measuring a whole number of the flowmeter pulses. For instance, the timer B may be started at a first whole pulse after interval time C, or some portion thereof, after timer A starts. The timer B may be stopped after a last whole pulse which occurs after timer A stops, and then after interval time C, or some selected portion thereof. Time shifting may be utilized to take the stored information of timer A or timer B or timer C and shift the information one way or the other.

In another embodiment of the invention, the invention may comprise a time shifting method for shifting the time of a series of flowmeter output pulses for comparison with the calibrated flow volume that flows in the interval defined by starting and stopping timer A. Some time interval, which may be selected in various ways as discussed hereinafter, may be added or possibly subtracted as desired for the particular testing situation. In one possible preferred embodiment, the time shifting may preferably be used to match the measured flowmeter volume with the timing of the calibrated flow volume of timer A.

In another embodiment, the invention may comprise a flowmeter. The flowmeter may comprise one or more measurement elements for measuring fluid flow. The flowmeter may comprise no moving parts within the fluid flow. The flowmeter may, if desired, produce a series of output pulses in response to the fluid flow. The flowmeter may further comprise a measurement element or multiple measurement elements for excitation to thereby produce the series of output pulses. Additional elements may comprise a pulse interval measurement module operable for producing one or more signals representative of one or more delays or time intervals, such as between the excitation of the measurement element and production of an output pulse in response to the excitation.

A flowmeter may further comprise one or more measurement elements wherein a pulse interval measurement module is operable for producing one or more signals representative of one or more delays or intervals between an initial excitation of at least one of the one or more measurement elements and the output pulse.

In another embodiment of the invention, a method for proving a computational flowmeter may comprise one or more steps such as, for instance, determining a correction interval or time interval C between a measurement of fluid flow within the computational flowmeter and a flowmeter output for said measurement. Other steps may comprise determining a time interval for a calibrated volume of fluid to flow through a pipe, and utilizing the correction interval for selecting a time interval of the flowmeter output which corresponds to the calibrated volume of fluid.

The step of determining a time for the calibrated volume of fluid through a pipe may comprise starting a clock A and stopping a clock A. The method may then further comprise selecting the time interval of the flowmeter output by starting a clock B after starting clock A, and after the interval of Time C. The method may be implemented with software, hardware, and/or a combination of software and hardware. The method may be implemented utilizing already data which is collected and stored. Thus, the measurement results may or may not be determined in real time.

While the present invention will be described in connection with presently preferred embodiments, it will be understood that it is not intended to limit the invention to those embodiments. On the contrary, it is intended to cover all alternatives, modifications, and equivalents included within the spirit of the invention and as defined in the appended claims.

DESCRIPTION OF PRESENTLY PREFERRED EMBODIMENTS

Figure 1:
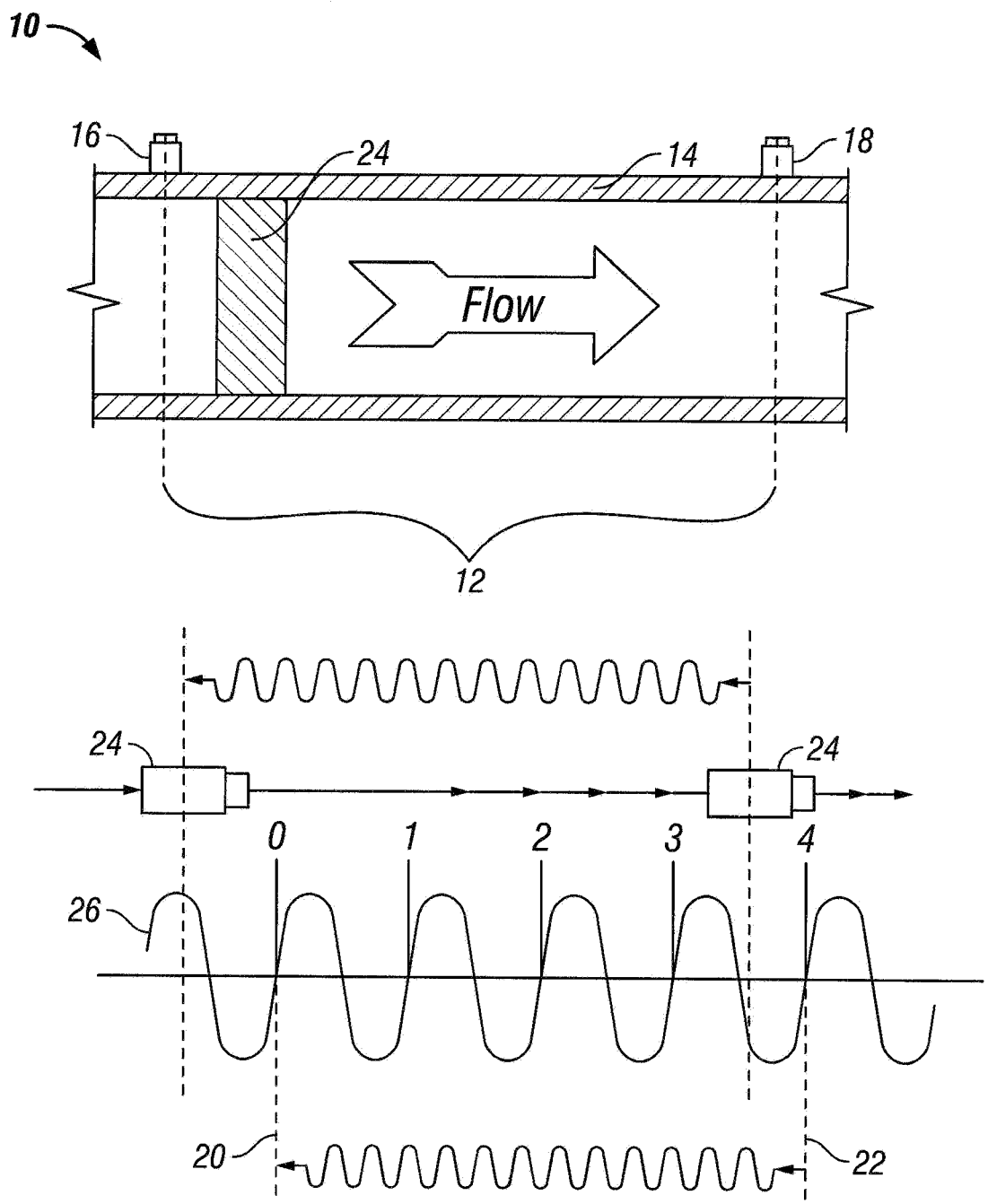
FIG. 1 is a side elevational view schematic, in cross-section, of a double chronometry prior art prover which illustrates the principal of operation of the two clocks used with flowmeter pulses.
Figure 2:
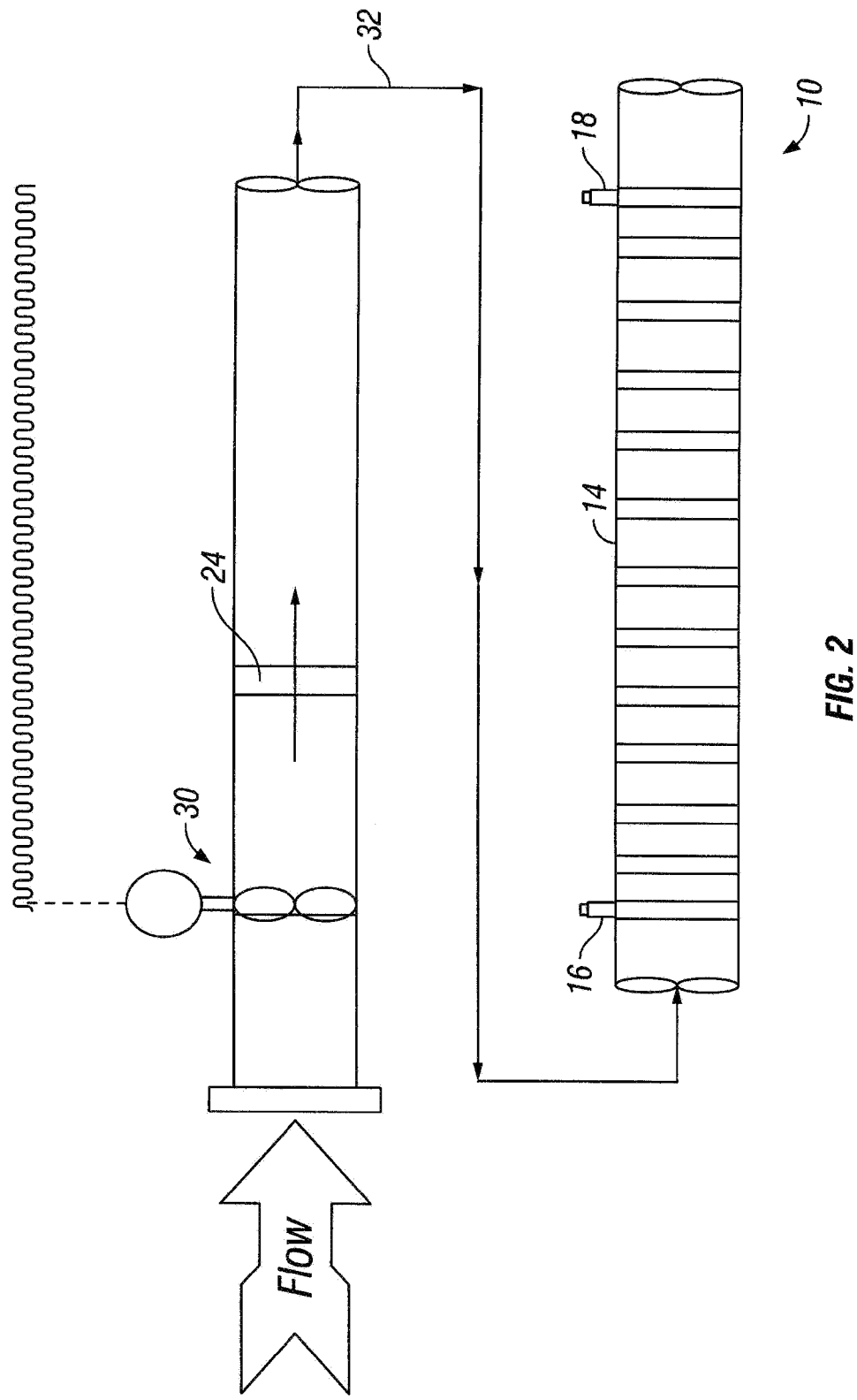
FIG. 2 is a side elevational view schematic, in cross section, showing the synchronous (analogous) behavior in liquid columns wherein the calibrated portion of pipe of the double chronometry prover downstream from a non-computational flowmeter is synchronous with the measurement of the same volume flowing through the non-computational flowmeter.

Referring now to the figures, and more particularly to FIG. 2, the synchronous (analogous) behavior in liquid columns is illustrated. The calibrated portion of pipe 14 of the double chronometry prover 10 between first detector 16 and second detector 18 downstream from the non-computational flowmeter 30 flow synchronously with respect to the same volume of fluid that flows through non-computational flowmeter 30. In line, liquid volumetric meter provers, such as prover 10, rely at least in part on synchronous or analogous behavior of the liquid column, indicated schematically at 32, in order to function. Simply stated, substantially uncompressible fluid 32 moving through flowmeter 30 should correlate with an equal increment of fluid further along the line, i.e., the calibrated volume of fluid between first detector 16 and second detector 18. Accordingly, using a calibrated section of pipe 14 with appropriate starting and ending sensors 16 and 18, and a displacer indicated schematically at 24 (in FIG. 1) that can move between starting and ending sensors with the fluid column, normally provides a means for determining meter accuracy. This method provides a means of comparing a known fluid volume (the fluid volume between the detectors) With the reported throughput of the meter.

Non-computational meters, such as non-computational flowmeter 30, that mechanically integrate the flow profile produce representative output pulses that are generally well correlated in time with the measurement event. This is because the mechanical movement is directly converted into pulses by the flowmeter electronics. No appreciable delay in signal transmission should be introduced in the process as a result of either processing or wait states in the integration process, which occurs in computational meters. In other words, output signal production of the non-computational flowmeter is contiguous with the integration process. Therefore, the pulse train produced by non-computational flowmeter 30 normally measures a fluid volume which is analogous to the calibrated fluid volume during the same time interval, even though it is not the same calibrated fluid volume. If the pulse output of the non-computational flowmeter is started and stopped with the measurement of the time interval required for the calibrated fluid volume to flow past the detectors 16 and 18, then the same liquid volume as the calibrated volume should have flowed through the non-computational flowmeter 30.

Figure 3:
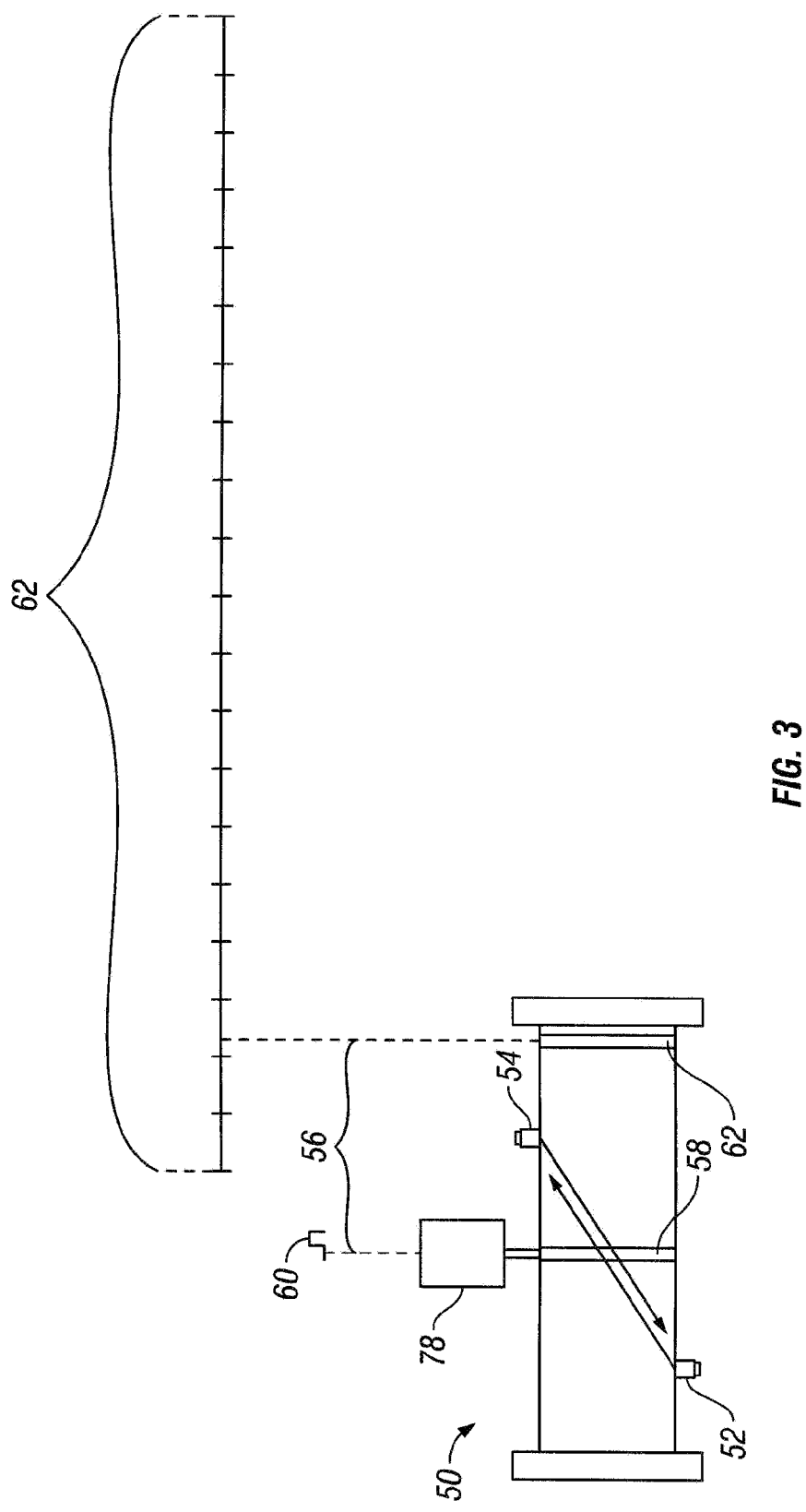
FIG. 3 is a side elevational view schematic, in cross-section, showing the interior components of a computational flowmeter with a computationally derived integration of volumetric flow.

The same is not true of computational flowmeter 50 shown in FIG. 3. Meters of this type must integrate the flow field through data assimilation and calculation after the actual measurement event. Such is the case with ultrasonic flowmeters and Coriolis mass flow meters. In more detail, computational flowmeter 50 comprises one or more transducers 52 and 54. In operation transducer 52 may produce, for instance, an acoustic signal which is subsequently received by 54. Transducers may be excited electrically, magnetically, vibrationally, by impact or the like, to produce a signal, such as an acoustic signal, that can be utilized by flowmeter 50 in measuring fluid flow directly or indirectly. Transducer 54 may also produce an acoustic signal or sound pulse which is subsequently received by transducer 52. The difference in the speed of sound and/or other physical phenomena measurement as used in the different types of computational flowmeters may be utilized to determine the flow through computational flowmeter 50. It will be appreciated that some time delay or time interval as indicated at 56 occurs between the time the flow is measured and a pulse output 60 is generated by computational flowmeter 50. It will be appreciated that during the data sampling and computation time period as indicated at 56, that a fluid section at position 58 moves to position 62.

Therefore, the inventor submits that the assumption that the same flow profile at the meter occurs in the prover is simply not true for computational flowmeters, as it may normally be for non-computation flowmeters. Moreover, the delay or interval 56 can vary due to temporary causes such as changes in fluid viscosity and types of fluid. As well, the delay or interval 56 can vary gradually due to build up or caking or coating over the one or more sets of transducers 52 and 54. In other words, the measurement event (defined herein as the excitation of the first transducer in the array) and the fluid that is correlated with that event as indicated at 58 are followed by processing and transducer wait states that introduces a delay in the pulse output 60. The representative output pulse 60 is therefore no longer correlated in time with the fluid that it represents.

The inventor submits that errors in proving computational flowmeters when tested using dual chronometer small volume provers arise for this reason. The error is especially significant for small volume provers. For instance, a 4-inch meter operating at 1000 GPM will pass approximately 135 linear inches of fluid in 1 second (16.6 gallons). If the flowmeter delay or time interval 56 is 50 milliseconds, and the measurement time 62 for the small volume prover is one second, then it will be appreciated that the error can be very significant. For large volume provers, the error is still present but the delay will be a much smaller portion of the large volume measurement time. For this reason, the inventor submits that computational flowmeters have tested much better with large volume provers.

Figure 4:
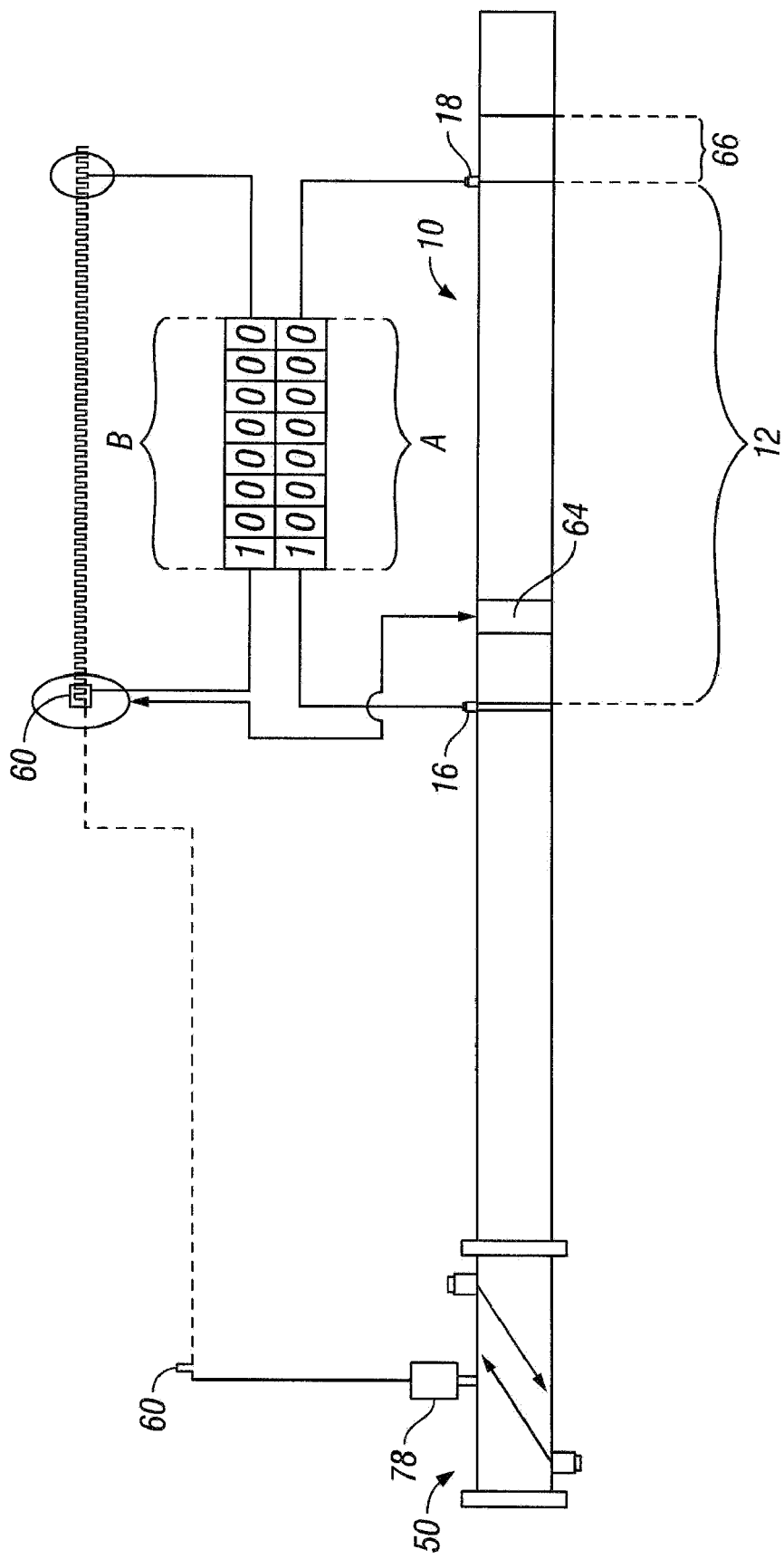
FIG. 4 is a side elevational view, in cross-section, showing a computational flowmeter upstream from a double chronometry prover and the timing relationships, pulse train, and errors in the fluid volume measured in accord with one possible embodiment of the present invention.

The error impact on meter proving is illustrated in the context of meter prover 10 measurement system in FIG. 4. Where meters with computationally derived output signals are employed, an error is created by virtue of the inherent measurement and processing delays. The first pulse 60 collected after the prover displacer encounters the first detector will represent a volume of fluid 64 that is downstream of the detector. The linear displacement of fluid represented by the meter pulse will be equal to the time displacement created by the meter. This linear displacement can vary for various reasons between times when the meter is proven.

A computational flowmeter with a very conservatively estimated delay of 50 milliseconds may introduce as much as a 5% error in the data collected during a 1 second proof. It will therefore be appreciated that the calibrated volume 12 is not equivalent to the volume actually measured. In the end, this volume for which there is no comparative data in the form of meter pulses, is used and produces an error in the meter factor calculation. The difference in overlap between the two volumes will be the volume indicated at 66. However, this volume 66 (which should have been included for the test) is discarded.

Three types of provers are considered here; however similar effects are expected in gravimetric and volumetric provers that are not of "in-line" construction. The three types specifically considered here include unidirectional (ball and piston), bidirectional ball, and ballistic style provers such as the Brooks Compact or Calibron units. The illustrations presented here include dual chronometry on a ballistic prover. A direct comparison of meter volume and prover volume as in conventional provers would not include the dual clocks illustrated here.

As discussed above, dual chronometry provers utilize two clocks, indicated here as clock A and clock B, to control the collection of meter pulses so as to collect only whole pulses and avoid the difficulty of reconciling partial pulses against the prover's collected volume. This is accomplished by starting the pulse collection with the first whole pulse after the first detector 16 in the prover is tripped. Simultaneously, high speed clock B begins timing the duration of the pulse collection. High speed clock A begins when the first detector 16 is tripped. High speed clock A is stopped when displacer trips final detector switch 18. High speed clock B is stopped with the leading edge of the first flowmeter pulse after high speed clock A has stopped.

Figure 5:
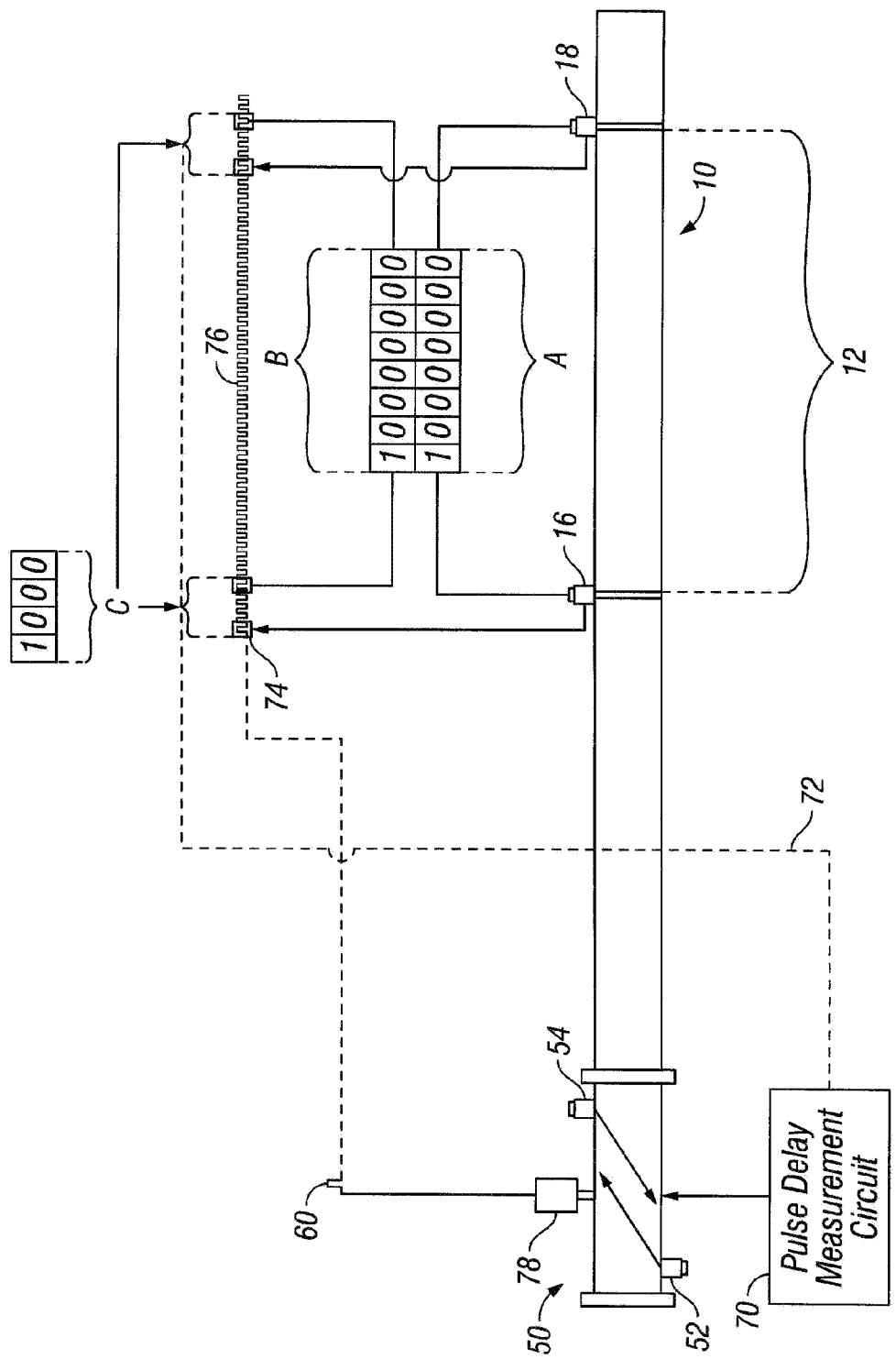
FIG. 5 is a side elevational view, in cross-section, showing a computational flowmeter upstream from a double chronometry prover and the timing relationships, pulse train, and corrections to the fluid volume measured in accord with one possible embodiment of the present invention.

FIG. 5 illustrates some possible solutions to the problem in accord with the present invention utilizing pulse delay or time interval C measurement module and/or software assembly 70.

Referring to the pulse train output 76, pulse 74 represents the first increment of fluid in the prover and is the real time representative of fluid passing the meter at the initiation of the proof cycle (synchronous movement of the liquid). Pulse 74 is not yet available for collection by the prover instrumentation. However, insertion of the appropriate delay or time interval C will reconcile the temporal mismatch.

Pulse interval measurement circuit 70 is utilized to determine delay or time interval C. Delay or time interval C may be measured by producing a single test cycle or a selected number of cycles from a test function available (either manually or through software) that would actuate the measurement cycle for the delay C. Pulse delay or time interval measurement circuit or temporal reconciliation module 70 may be operable for determining the delay and/or making starting and stopping adjustments for highly accurate clock B so that the fluid volume measurement by flowmeter 50 is matched to the calibrated fluid volume through prover 1 0. The data may be collected and subsequently time shifted as desired utilizing software.

Pulse delay or time interval measurement circuit and/or software module (which also be referred to as temporal reconciliation module) 70 may have various components in different instruments such as the flowmeter or prover or may be located within the flowmeter entirely. It will be appreciated as further discussed hereinafter, that various hardware and/or software mechanism may be utilized to perform the function of time interval measurement circuit and/or software module 70, and that module 70 shown in FIG. 5 simply provides one possible solution.

In this example, one part of pulse delay or time interval measurement circuit 70 may produce data for measurement of the delay or time interval C for use in prover software and/or may actually make a measurement of the time from excitation of the first measurement element (transducer or otherwise such as transducer 52) to production of the associated output pulse 60, i.e., a measurement of delay C.

In another embodiment of the invention, either separately or in conjunction with measurements of a test cycle, delay or time interval C may be measured continuously during operation of the meter for constant monitoring used during proving and at other times. As well, various contributory aspects of delay or time interval C may be separately recorded, e.g., the time between initial sound pulse production at the transducers 52 and 54 and the receipt of the return pulses, the time spent analyzing the data in calculation module 78, the time spent calculating flow and pulse production in calculation module 78, and so forth. In other words, all aspects which produce any part of delay C may be measured, transmitted, recorded, or the like as desired. Software may be utilized with this information for time shifting the flowmeter output data so that it is the flow volume that is synchronous or matches with the calibrated flow volume.

The delay output signal(s) 72 may be provided on separate output(s) on the flowmeter or may be embedded within the pulse train output signal or otherwise transmitted, recorded, stored, or used as desired.

For instance, in one possible embodiment, the delay output signal 72 that indicates the beginning of the test cycle may be provided as a separate output at the flowmeter. In another embodiment, a signal representative of the delay may be encoded into the output pulse train or otherwise be combined such as by modulation, use of different frequencies, or the like.

The prover data collection instrumentation (whether discreet components or discreet components integrated with software as in a flow computer and/or control device) may add an input (start test cycle indicator) to indicate the start of a test which determines the delay. The prover data collection instrumentation may also add an additional high speed clock "C" register as indicated in FIG. 5. In one possible embodiment, high speed clock "C" may measure the duration of the delay or time interval exhibited by the meter from excitation of the first measurement component, e.g., element 52, until the output pulse 60 is produced.

The invention may utilize modified software or hardware components from presently available flowmeters and/or provers, or make additions to them to insert the duration of the delay expressed in the test cycle C to the collection of meter pulses in such a way as to delay their collection for that period of time along with the start of the pulse collection clock register (clock B). For instance, the prior art second detector 18 function of discontinuing pulse collection may be altered to add the duration of the test cycle C to its real time actuation. All other functions associated with the prover detector switches may remain unaltered.

In another embodiment, timing information and information from clocks A, B, and C (or output(s) 72) may be provided to a software controlled processor which then provides the desired correction. In this way, pulse stream 76 produced by flowmeter 50 is temporally shifted or reconciled with the calibrated prover fluid volume 12.

For use with flowmeters/provers in the case of non-computational flow integration, the system may be disabled because for non-computational flowmeters the prior art process is successful in light of the fact that the first pulse collected is contiguous in time with the volume represented and the slight offset in pulse collection is reconciled by the ratio of collected clock ticks from timing the proof duration and the duration of time to collect pulses.

In one embodiment of the invention, the invention may comprise a time shifting method for shifting a selected time interval of a series of flowmeter output pulses for comparison with the calibrated flow volume that flows in the interval defined by starting and stopping timer A. Some time interval, which may be selected in various ways as discussed hereinbefore, may be added or possibly subtracted as desired for the particular testing situation. In one possible preferred embodiment, the time shifting may preferably be used to match the measured flowmeter volume with the timing of the calibrated flow volume of timer A. The shifting may take place in real time or may be the result of operating on stored data.

Figure 6:
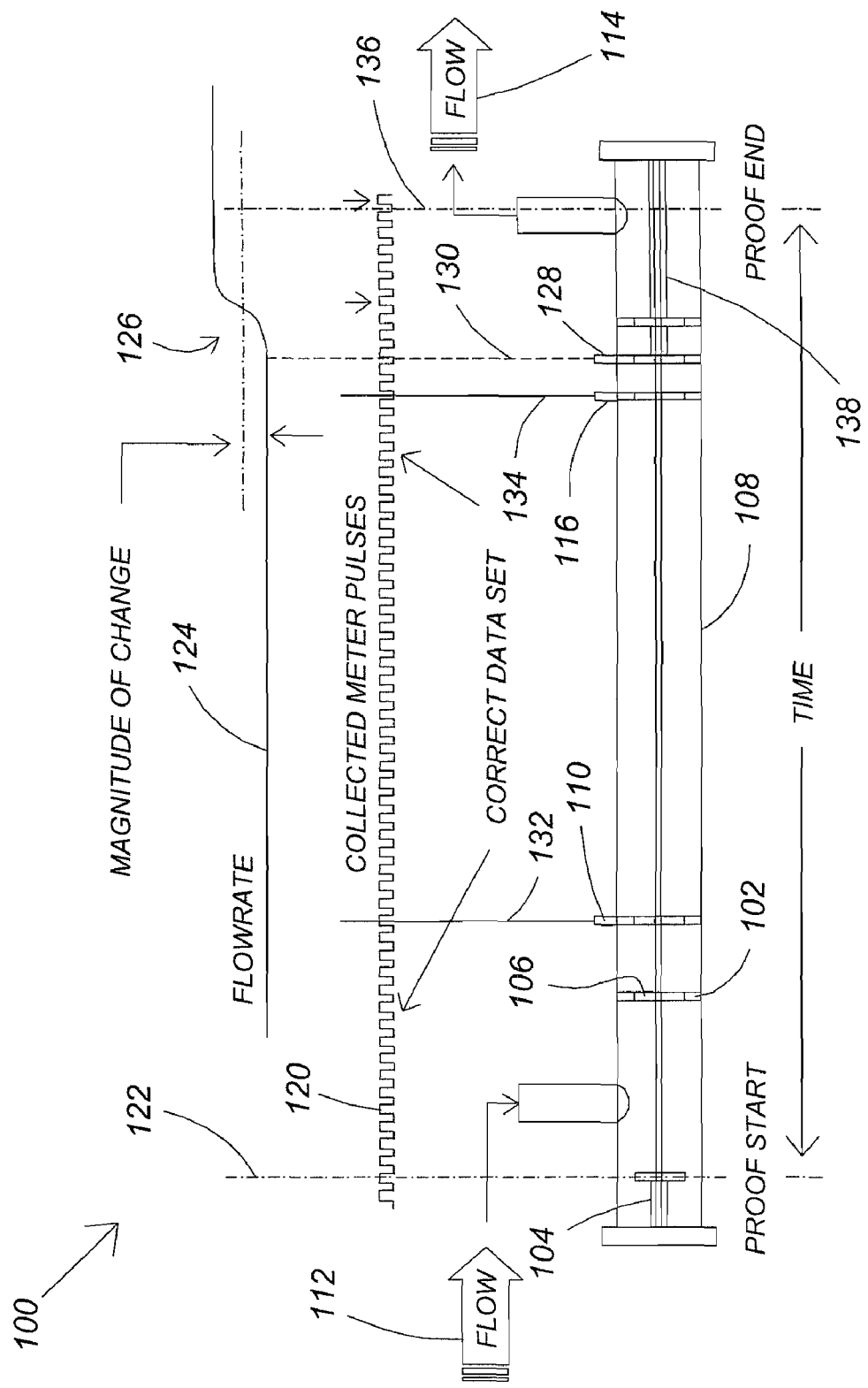
FIG. 6 is a side elevational view, in cross-section, showing a computational flowmeter upstream and a prover with timing relationships, pulse train, and corrections to the volume measured in accord with an embodiment of the present invention.

In another embodiment of the invention, as shown in FIG. 6, the prover may be utilized for corrections to the computational meter without need for additional information from the computational meter. Thus, a prior art computational meters may be utilized without modifications and/or without additional information produced therefrom as discussed above. Accordingly, the present invention provides many different ways for temporal reconciliation of a time interval B of the flowmeter output signal as compared with the correct time interval A for a calibrated volume of fluid. In other words, referring to the previous discussion with respect to FIG. 5, there are various ways in which pulse stream 76 produced by flowmeter 50 is temporally shifted or reconciled with the calibrated prover fluid volume 12.

In the embodiment shown in FIG. 6, fluid flow through the prover 100 is continuous and the proof is done "on the fly." This may be accomplished by the launch of a perforated displacer 102 from displacer launcher 104. Perforated displacer 102 comprises at least one controllable opening 106, which is initially closed or which closes as it approaches calibrated section 108 of prover 100, and before reaching first detector 110. Perforated displacer 102 is pushed along by the flowing stream of fluid through as indicated by input flow stream 112 and output flow stream 114 through prover 100. Data is collected from prover 100 and the flow meter as displacer 102 moves through prover 100. At the end of calibrated section 108, second detector 116, perforated displacer 102 goes into bypass mode by opening the perforation(s) of perforated displacer 102 and allowing unimpeded flow to resume through the prover barrel.

Prior art provers merely capture the meter pulses produced by the meter during the time the displacer is between first detector 110 and second detector 116. However, due to the inherent delay of computational flowmeters, the data stream measured between the first detector and second detector is not representative of the actual measured volume of fluid. It is also noted that in some cases, where there may be bubbles or the like in the fluid, then delays may occur when testing non-computational flowmeters. Accordingly, the prover embodiment discussed hereinafter may be utilized to improve proof accuracy regardless of the type of meter tested, whether it be a computational flowmeter or a non-computational flowmeter, and to verify the operation of the prover/flowmeter configuration.

In the example of FIG. 6, the prover may preferably begin collecting pulses of pulse train 120 at least from the time perforated displacer 102 is launched as indicated by pulse collection start line 122. Collection of pulses from pulse train 120 continues until after the prover enters the bypass mode and a change of fluid flow rate occurs. Flow rate 124 is measured by computational meter. Flow rate change 126 in flow rate 124 occurs after the prover enters bypass mode, i.e., after the controllable opening 106 of perforated displacer 102 opens. Bypass start timer 128 may be utilized to measure the time at which controllable opening 106 is opened, as indicated by bypass start line 130. Timer start line 132 represents the time when displacer 102 is detected by first detector 110 and timer stop line 134 represents when displacer 102 is detected by second detector 116.

In brief, the shifting time C discussed hereinbefore may be determined by measuring the time from when the prover bypass mode is entered and a change in the magnitude of the fluid flow rate is detected by the computational flow meter. This correction may be utilized to shift pulse train 120 as necessary. While the possibility of measuring time C is shown directly from transitioning from a proving mode to a bypass mode in this example, the possibility of detecting the change of flow might be made separately or at different times or transitioning from a bypass mode to a proving mode or using entirely different equipment for this purpose. However, in this example all testing occurs in roughly the same time period using the same prover equipment.

In operation pulse train 120 is recorded at least as early as pulse collection start line 122 when displacer 102 is launched from displacer launcher 104. Once displacer 102 reaches first detector 110, start timer line 132 is marked on pulse train 120. High speed clock A begins when the first detector 110 is tripped. High speed clock A may be stopped when displacer 102 trips second detector switch 116. Alternatively, high speed clock A might be stopped when bypass start switch 128 is tripped assuming the prover volume is calibrated to this point. As discussed hereinbefore high speed clock B may begin with detection of the first whole pulse after first detector 110 is tripped and may end with the detection of the first whole pulse after second detector 116 is tripped or after bypass start switch 128 is tripped. In this embodiment, a third high speed timer C may be utilized, as discussed above. Alternatively, software may be utilized to effectively produce the delay time C used to shift the pulse train as discussed hereinbefore. As another alternative, second detector 116 might also be used as the bypass start switch if the prover were modified so that bypass mode of operation begins at this same moment.

Data collection of pulse train 120 produced by the computational meter (or non-computation meter) continues until, as shown here figuratively at proof end line 136. In one possible embodiment, bypass start line 130 is used to effectively start high speed clock "C" which may measure the duration of the delay or time interval from bypass start line 130 when the prover bypass mode starts until proof end line 136.

The prover bypass mode may be started in various ways depending on the construction of the prover. For instance, an interior plug may be physically pushed out of opening 106 by rod 138 or the like, which engages opening 106 at timer 128. Other means may also be used to start the prover bypass mode. Thus, prover 100 may need to have a switch, such as switch 128, mounted for indicating the initiation of bypass mode in a fixed position for good repeatability. The number of whole pulses may be measured from after bypass start line 13 until the first whole pulse after proof end line 136.

Proof ending line 136 may be determined in different ways and is shown here more for explanation purposes than as a exact time line. Proof ending line 136 occurs when change 126 in flow rate 124 occurs as a result of prover bypass. Thus, proof ending line 136 might be determined to be along the changing slope of change 126. The specific method of detecting a "change" such as change 126 can be one of many different ways. For instance, a change may be indicated due to a specific and absolute magnitude change, or a rate of change of flow rate 124, and/or other means. Statistical means for detecting the "change" might, for instance, comprise a deviation in flow rate 124 from the mean rate during proof of 2 sigma (2 standard deviations) or some other known statistically measurable change. However, any strategy that would represent a conservative determination of rate change would suffice, and preferably would be consistently utilized for comparison purposes.

In one embodiment, the prover detector switches 110 and 116 are used to set markers that show displacer 102 passage prover 100 in terms of both pulse data stream 120 and with respect to a time line. The amount of pulse shifting might be determined by measuring the number of whole pulses detected starting with the first whole pulse after bypass start line 130 and ending with the first whole pulse detected after the change 126 (shown very roughly here for explanation purposes as line 136). The number of whole pulses may be shifted by this number of pulses, as discussed hereinbefore with respect to FIG. 5 in order to associate the pulse output that is actually associated with the time from timer A. The new elapsed time B to collect these whole pulses is measured and the meter factor K is calculated.

It will be appreciated from the discussion above that the prover may be designed in different ways. As well the computation flowmeter may be designed in various ways. Thus, the present invention provides a method and apparatus for proving computational flowmeters by determining a timing displacement. Several methods and systems have been shown that determine a timing displacement that is used to calculate time B that is associated with the whole pulse outputs for the same volume of fluid that is actually measured by timer A. In other words, the invention calls for determining the timing displacement regardless of how it is done, and then making the correction.

However, it will also be appreciated that the present invention provides a prover that can be used to more accurately prove non-computational flowmeters wherein errors arise due to variation in the proof volume and the collected data associated with the proof volume that may create a delay. For instance, variations may occur due to bubbles or other problems in the proof fluid.

Accordingly, the foregoing disclosure and description of the invention is illustrative and explanatory thereof, and it will be appreciated by those skilled in the art, that various changes in the ordering of steps, ranges, hardware, software, and/or attributes and parameters, as well as in the details of the illustrations or combinations of features of the methods and apparatus discussed herein, may be made without departing from the spirit of the invention.

What is claimed is:

1. A method for use in proving a flowmeter in response to a fluid flow rate through said flowmeter, said flowmeter producing a series of flowmeter output pulses wherein each flowmeter output pulse is representative of a volume of fluid flow through said flowmeter, said method comprising:
   determining a time interval C between at least one particular volume of said fluid flow past at least one measuring element of said flowmeter and a subsequent production of a flowmeter output pulse that represents said at least one particular volume of fluid flow, said time interval C representing a delay time during which said at least one particular volume of fluid flow is displaced from said at least one measuring element by a physical distance of said time interval C multiplied by said fluid flow rate.

2. The method of claim 1, further comprising;
   determining a time interval A for a calibrated volume of fluid to flow through a pipe; and
   utilizing said time interval C for selecting a time interval B portion of said series of flowmeter output pulses for comparison with said time interval A to prove said flowmeter.

3. The method of claim 2 further comprising:
   determining said time interval A for said calibrated volume of fluid through a pipe by starting a clock A and stopping said clock A as a displacer moves through a calibrated volume of pipe; and
   selecting a beginning for said time interval B portion of said series of flowmeter output pulses for comparison with said time interval A to prove said flowmeter by selecting a whole flowmeter output pulse that occurs after starting clock A, and after said time interval C.

4. The method of claim 3 further comprising selecting an ending for said time interval B portion of said series of flowmeter output pulses for comparison with said time interval A to prove said flowmeter by selecting a whole flowmeter output pulse that occurs after stopping clock A, and after said time interval C.

5. The method of claim 1 further comprising:
   implementing said method utilizing software or hardware or a combination of software and hardware and said flowmeter is a computational flowmeter.

6. The method of claim 2 further comprising:
   utilizing collected and stored data for said selecting of said time interval B portion of said series of flowmeter output pulses for comparison with said time interval A to prove said flowmeter.

7. The method of claim 1 wherein said determining a time interval C further comprises electrically exciting said at least one measuring element of said flowmeter and activating a timer in response to said electrically exciting said at least one measuring element.

8. The method of claim 1 wherein said determining a time interval C further comprises detecting a change of said fluid flow rate through said flowmeter.

9. The method of claim 1 wherein said determining a time interval C further comprises further comprises detecting switching a prover to a bypass mode of operation.

10. A flowmeter/prover system for proving a flowmeter in response to a fluid flow rate through a prover, at least one measurement element of said flowmeter used in producing a series of flowmeter output pulses wherein each flowmeter output pulse is representative of a volume of fluid flow through said flowmeter, a time interval C representing a delay time between at least one particular volume of said fluid flow past said at least one measuring element of said flowmeter and a subsequent production of a flowmeter output pulse, said time interval C representing a delay time during which said volume of fluid flow is displaced from said at least one measuring element by a physical distance of said time interval C multiplied by said fluid flow rate, said flowmeter/proving system comprising:
   an A timer for measuring a time interval A for a calibrated volume of fluid to flow through a corresponding calibrated portion of said flowmeter/proving system;
   a C timer to measure said delay time C; and
   a processor operable for utilizing said time interval C in selecting a time interval B portion of said series of flowmeter output pulses for comparison with said time interval A to prove said flowmeter.

11. The flowmeter/prover system of claim 10, further comprising a B timer for measuring said time interval B portion of said series of flowmeter output pulses wherein said time interval B portion of said series of flowmeter output pulses consists of a number of effectively whole pulses.

12. The flowmeter/prover system of claim 10, further comprising a plurality of detectors for starting and stopping said A timer and said C timer.

13. The flowmeter/prover system of claim 12, wherein said plurality of detectors comprises a detector operable for detecting an electrical excitation of said at least one measurement element.

14. The flowmeter/prover system of claim 12, wherein said plurality of detectors comprises a transition detector operable for detecting a transition between different modes of operation of a prover.

15. The flowmeter/prover system of claim 12, wherein said plurality of detectors comprises a detector operable a transition to a prover bypass mode of operation for a prover.

16. The flowmeter/proving system of claim 10, wherein said processor utilizes software for selecting said time interval B.

17. A flowmeter/proving system, comprising:
   a calibrated portion of pipe for measuring a calibrated volume of fluid with which to prove a flowmeter;
   a displacer moveable through said calibrated portion of pipe for displacing said calibrated volume of water for proving said flowmeter while said flowmeter/proving system is in a proving mode of operation;
   position detectors for detecting a position of said displacer in said proving mode of operation;

a bypass flowpath for use during a bypass mode of operation that permits fluid flow through said flowmeter when said displacer is not being used for displacing said calibrated volume of fluid;

an operation mode detector for detecting a change of operation between said proving mode of operation and said bypass mode of operation;

a fluid flow detector for determining a change in fluid flow through said flowmeter as a result of said change of operation between said proving mode of operation and said bypass mode of operation; and a timer for measuring a time interval C which is the time between said change of operation and said change in fluid flow.

18. The flowmeter/proving system of claim 17, wherein said position detectors comprise at least two detectors positioned at a beginning and an end of said calibrated portion of pipe and further comprising an A timer for measuring a time interval A for said calibrated volume of fluid to flow through said calibrated portion of pipe.

19. The flowmeter/proving system of claim 17, wherein said fluid flow detector comprises a processor.

20. The flowmeter/proving system of claim 17, further comprising software for analyzing an output of said flowmeter and selecting an interval B portion of said output for comparison with said time interval A in proving said flowmeter.

* * * * *

UNITED STATES PATENT AND TRADEMARK OFFICE
CERTIFICATE OF CORRECTION

PATENT NO.        : 7,395,690 B2
APPLICATION NO.   : 11/533012
DATED             : July 8, 2008
INVENTOR(S)       : Galen Cotton It is certified that error appears in the above-identified patent and that said Letters Patent is hereby corrected as shown below:

Column 16, Claim 9, line 10, delete one set of "further comprises".

Signed and Sealed this

Thirtieth Day of September, 2008

JON W. DUDAS
*Director of the United States Patent and Trademark Office*